(12) United States Patent
Naito et al.

(10) Patent No.: US 12,503,179 B2
(45) Date of Patent: Dec. 23, 2025

(54) CRAWLER-TYPE VEHICLE

(71) Applicant: Caterpillar SARL, Geneva (CH)

(72) Inventors: Takayuki Naito, Akashi (JP); Yasutaka Genko, Akashi (JP); Manikandan Rajangam, Chiyoda-ku (JP)

(73) Assignee: Caterpillar SARL, Geneva (CH)

( * ) Notice: Subject to any disclaimer, the term of this patent is extended or adjusted under 35 U.S.C. 154(b) by 706 days.

(21) Appl. No.: 17/790,552

(22) PCT Filed: Dec. 31, 2020

(86) PCT No.: PCT/EP2020/025604
§ 371 (c)(1),
(2) Date: Jul. 1, 2022

(87) PCT Pub. No.: WO2021/139873
PCT Pub. Date: Jul. 15, 2021

(65) Prior Publication Data
US 2023/0032025 A1    Feb. 2, 2023

(30) Foreign Application Priority Data

Jan. 7, 2020 (JP) ................. 2020-000802

(51) Int. Cl.
*B62D 55/088* (2006.01)
*B60S 1/68* (2006.01)
*B62D 55/14* (2006.01)

(52) U.S. Cl.
CPC ......... *B62D 55/0882* (2013.01); *B62D 55/14* (2013.01); *B60S 1/68* (2013.01)

(58) Field of Classification Search
CPC .. B62D 55/14; B62D 55/088; B62D 55/0882; B60S 1/68
(Continued)

(56) References Cited

U.S. PATENT DOCUMENTS 2,077,919 A * 4/1937 Engstrom ................. B60S 1/68
280/856
2,531,111 A * 11/1950 Daniels ................ B62D 55/244
305/167
(Continued)

FOREIGN PATENT DOCUMENTS

CN        1803498 A       7/2006
CN     104210569 A  * 12/2014 ........... B62D 55/088
(Continued)

OTHER PUBLICATIONS

German Office Action for German Patent Appln. No. 11 2020 005 997.9, mailed Jul. 5, 2023 (11 pgs).
(Continued)

*Primary Examiner* — S. Joseph Morano
*Assistant Examiner* — Eva L Comino

(57) ABSTRACT

To provide a crawler-type vehicle capable of efficiently scraping off mud from an upper road wheel. A pair of scraper members are disposed on one side in the front-rear direction and on other side in the front-rear direction of an upper road wheel. Each scraper member is formed with a claw that protrudes toward the upper road wheel. A right-left directional position of the tip of the claw of one scraper member and a right-left directional position of the tip of the claw of the other scraper member are different from each other.

6 Claims, 6 Drawing Sheets

(58) Field of Classification Search
USPC .......................................................... 305/107
See application file for complete search history.

(56) References Cited

U.S. PATENT DOCUMENTS

| | | | | | |
|---|---|---|---|---|---|
| 2,560,307 | A | * | 7/1951 | Slemmons | B62D 55/14 |
| | | | | | 305/179 |
| 3,988,071 | A | * | 10/1976 | Cochran | E02D 3/026 |
| | | | | | 404/129 |
| 5,226,703 | A | * | 7/1993 | Norman | B62D 55/0882 |
| | | | | | 305/110 |
| 5,697,683 | A | * | 12/1997 | Arulandu | B62D 55/0882 |
| | | | | | 305/110 |
| 5,725,292 | A | * | 3/1998 | Keedy | B62D 55/0882 |
| | | | | | 305/110 |
| 6,318,545 | B1 | * | 11/2001 | Ross | B65G 45/12 |
| | | | | | 198/860.3 |
| 6,527,347 | B2 | * | 3/2003 | Brawley | B62D 55/0882 |
| | | | | | 301/110 |

FOREIGN PATENT DOCUMENTS

| | | | | | |
|---|---|---|---|---|---|
| CN | 104210569 | B | | 12/2014 | |
| DE | 19532376 | C1 | | 4/1997 | |
| GB | 328208 | A | * | 4/1930 | ............. B62D 55/08 |
| JP | S51139527 | U | | 11/1976 | |
| JP | 2004270300 | A | | 9/2004 | |
| JP | 2013249664 | A | | 12/2013 | |
| JP | 2016222162 | A | * | 12/2016 | ............. B62D 55/08 |
| JP | 201853598 | A | * | 4/2018 | ........... B62D 55/088 |
| JP | 2018053598 | A | | 4/2018 | |

OTHER PUBLICATIONS

International Search Report related to Application No. PCT/EP2020/025604 reported on Apr. 15, 2021.
Japanese Office Action for Japanese Patent Appln. No.2020-000802, mailed Jun. 6, 2023 (3 pgs).
China Office action for China Patent Appln. No.202080090911.1, mailed Oct. 25, 2024 (7 pgs).

* cited by examiner

CRAWLER-TYPE VEHICLE

CROSS-REFERENCE TO RELATED APPLICATION

This Application is a 35 USC § 371 U.S. National Stage filing of International Application No. PCT/EP2020/025604 filed on Dec. 31, 2020, which claims the benefit and priority of Japanese Application No. 2020-000802 filed on Jan. 7, 2020.

TECHNICAL FIELD

The present invention relates to a crawler-type vehicle capable of scraping off mud adhering to an upper road wheel.

BACKGROUND ART

A crawler-type vehicle such as a hydraulic excavator comprises a crawler frame extending in a front-rear direction; a drive wheel mounted on one side end part of the crawler frame in the front-rear direction; an idler wheel mounted on the other side end part of the crawler frame in the front-rear direction; an upper road wheel mounted on an upper part of the crawler frame in between the drive wheel and the idler wheel; a lower road wheel mounted on a lower part of the crawler frame in between the drive wheel and the idler wheel; and a crawler belt wound around the drive wheel, the idler wheel, the upper road wheel and the lower road wheel.

In a crawler-type vehicle, when the mud adhering to the crawler belt during traveling falls and build-ups around the upper road wheel, there is a possibility that the rotation of the upper road wheel is hindered, the upper road wheel is damaged, or the traveling becomes difficult. Thus, the crawler-type vehicle may be provided with a scraper member for scraping off the mud adhering to the upper road wheel (see, for example, Patent Literature 1).

PRIOR ART LITERATURES

Patent Literatures

[PATENT LITERATURE 1] U.S. Pat. No. 5,226,703

SUMMARY OF THE INVENTION

Problems to be Solved by the Invention

However, the scraper member of the crawler-type vehicle disclosed in the Patent Literature 1 serves to scrape off the mud adhering to the upper road wheel by a plurality of claws in a triangular shape, but there is a problem that the mud located between the claws cannot be scraped off from the upper road wheel, and ends up remaining on the upper road wheel.

A problem of the present invention made in view of the above-described fact is to provide a crawler-type vehicle capable of efficiently scraping off the mud adhering to the upper road wheel.

Means for Solving the Problems

The present invention provides a crawler-type vehicle as described below to solve the above problem. That is, the present invention provides A crawler-type vehicle comprising: a crawler frame extending in a front-rear direction; a drive wheel mounted on one side end part of the crawler frame in the front-rear direction; an idler wheel mounted on the other side end part of the crawler frame in the front-rear direction; an upper road wheel mounted on an upper part of the crawler frame in between the drive wheel and the idler wheel; a lower road wheel mounted on a lower part of the crawler frame in between the drive wheel and the idler wheel; and a crawler belt wound around the drive wheel, the idler wheel, the upper road wheel and the lower road wheel, wherein a pair of scraper members formed with claws protruding toward the upper road wheel are disposed, on one side in the front-rear direction and on the other side in the front-rear direction of the upper road wheel, and wherein a right-left directional position of a tip of a claw on one of the pair of scraper members and a right-left directional position of a tip of a claw on the other of the pair of scraper members are different from each other.

Preferably, a plurality of the claws are formed in each of the pair of scraper members, and a right-left directional position of a tip of at least one claw of a plurality of claws of the one of the pair of scraper members is different from any of right-left directional positions of tips of a plurality of claws of the other of the pair of scraper members. It is preferable that a shape of the one of the pair of scraper members and a shape of the other of the pair of scraper members are identical to each other. It is convenient that right-left directional dimensions of the claws become gradually narrower toward the upper road wheel, and further the claws are formed right-left asymmetrically. It is preferable that a right-left directional position of the one of the pair of scraper members and a right-left directional position of the other of the pair of scraper members are different from each other. It is suitable that the pair of scraper members are attachably and detachably fixed to the crawler frame and further configured to be movable toward the upper road wheel.

Favorable Effects of the Invention

In the crawler-type vehicle of the present invention, a pair of scraper members formed with claws protruding toward the upper road wheel are disposed, on the one side in the front-rear direction and on the other side in the front-rear direction of the upper road wheel, and a right-left directional position of a tip of a claw of the one scraper member and a right-left directional position of a tip of a claw of the other scraper member are different from each other. As a result, the mud adhering to different parts of the upper road wheel can be scraped off by the claw of the one scraper member and the claw of the other scraper member, and therefore the mud adhering to the upper road wheel can be scraped off efficiently.

DETAILED DESCRIPTION OF THE INVENTION

Hereinbelow, a preferred embodiment of the crawler-type vehicle configured in accordance with the present invention will be described with reference to the drawings.

Figure 1:
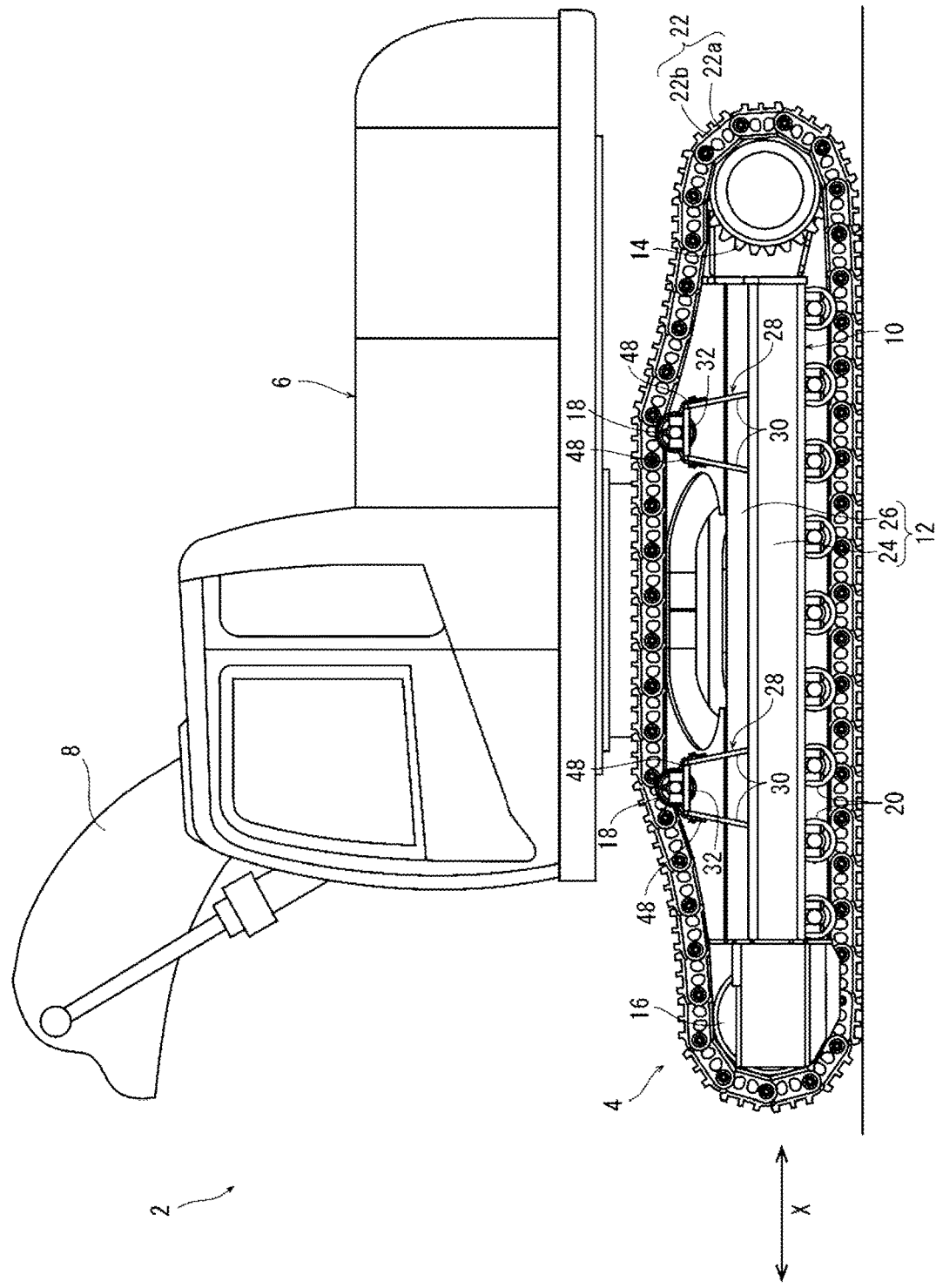
FIG. 1 is a side view of a crawler-type vehicle configured in accordance with the present invention.

When description is made with reference to FIG. 1, a crawler-type vehicle 2 which may be configured as a hydraulic excavator, for example, comprises a lower traveling structure 4, an upper swiveling structure 6 swivelably installed on the lower traveling structure 4, and a working arm device 8 (only a part thereof is illustrated) swingably connected to the upper swiveling structure 6, and the crawler-type vehicle 2 is designed to perform various operations such as excavation operation by swinging the working arm device 8.

The lower traveling structure 4 comprises a crawler frame 10. The crawler frame 10 includes a pair of support members 12 extending in the front-rear direction spaced apart from each other in the right-left direction. A drive wheel 14 is mounted on one side end part in the front-rear direction of each of the pair of support members 12, and an idler wheel 16 is mounted on the other side end part in the front-rear direction of each support member 12. The drive wheel 14 is connected to a rotary actuator (not illustrated) such as a hydraulic motor. The foregoing front-rear direction is a direction indicated by an arrow X in FIG. 1, and the foregoing right-left direction is a direction vertical to a paper surface in FIG. 1 and is a direction indicated by an arrow Y in FIG. 2.

Upper road wheels 18 are mounted on an upper part of each support member 12, and lower road wheels 20 are mounted on a lower part of each support member 12. As illustrated in FIG. 1, the upper road wheels 18 and the lower road wheels 20 are disposed between the drive wheel 14 and the idler wheel 16. A pair of the upper road wheels 18 are mounted so as to be spaced apart from each other in the front-rear direction (X direction), on each support member 12 of the illustrated embodiment, but the number of the upper road wheels 18 to be mounted on each support member 12 may be one, or may be three or more.

Each support member 12 comprises a crawler belt 22, and each crawler belt 22 is wound around the drive wheel 14, the idler wheel 16, the upper road wheels 18, and the lower road wheels 20. The crawler belt 22 has a plurality of link members 22a coupled in an endless annular shape, and a crawler plate 22b fixed to each link member 22a. Then, the crawler-type vehicle 2 is designed to travel by the rotation of the rotary actuator being transmitted to the crawler belt 22 via the drive wheel 14.

The support member 12 of the crawler frame 10 includes a side wall 24 extending in the front-rear direction and an upper wall 26 extending obliquely upwardly toward the inside in the right-left direction (Y direction) from the upper end of the side wall 24. A pair of brackets 28 are fixed to the upper surface of the upper wall 26 spaced apart from each other in the front-rear direction.

Figure 2:
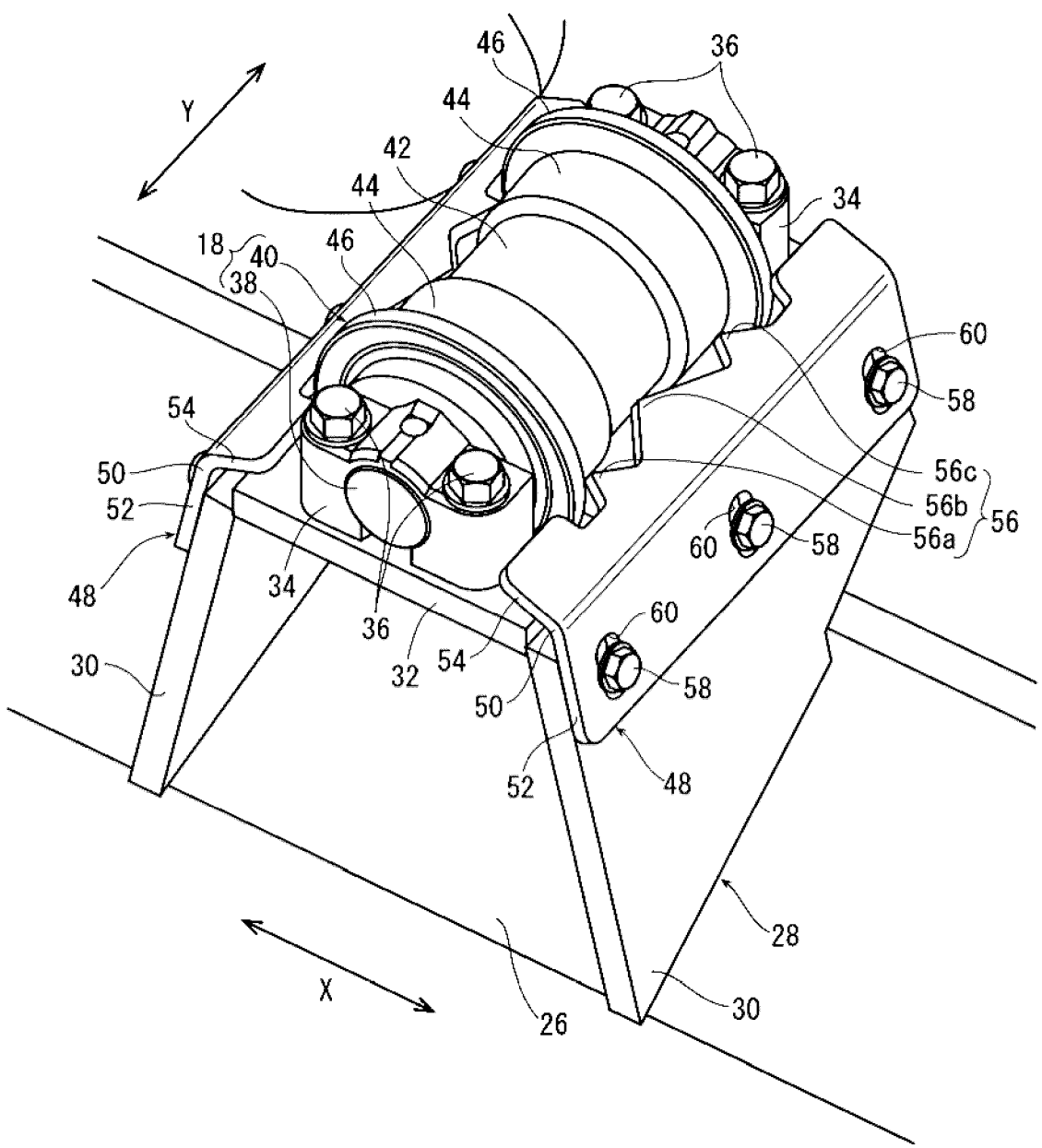
FIG. 2 is a perspective view of an upper road wheel and other components illustrated in FIG. 1.
Figure 3:
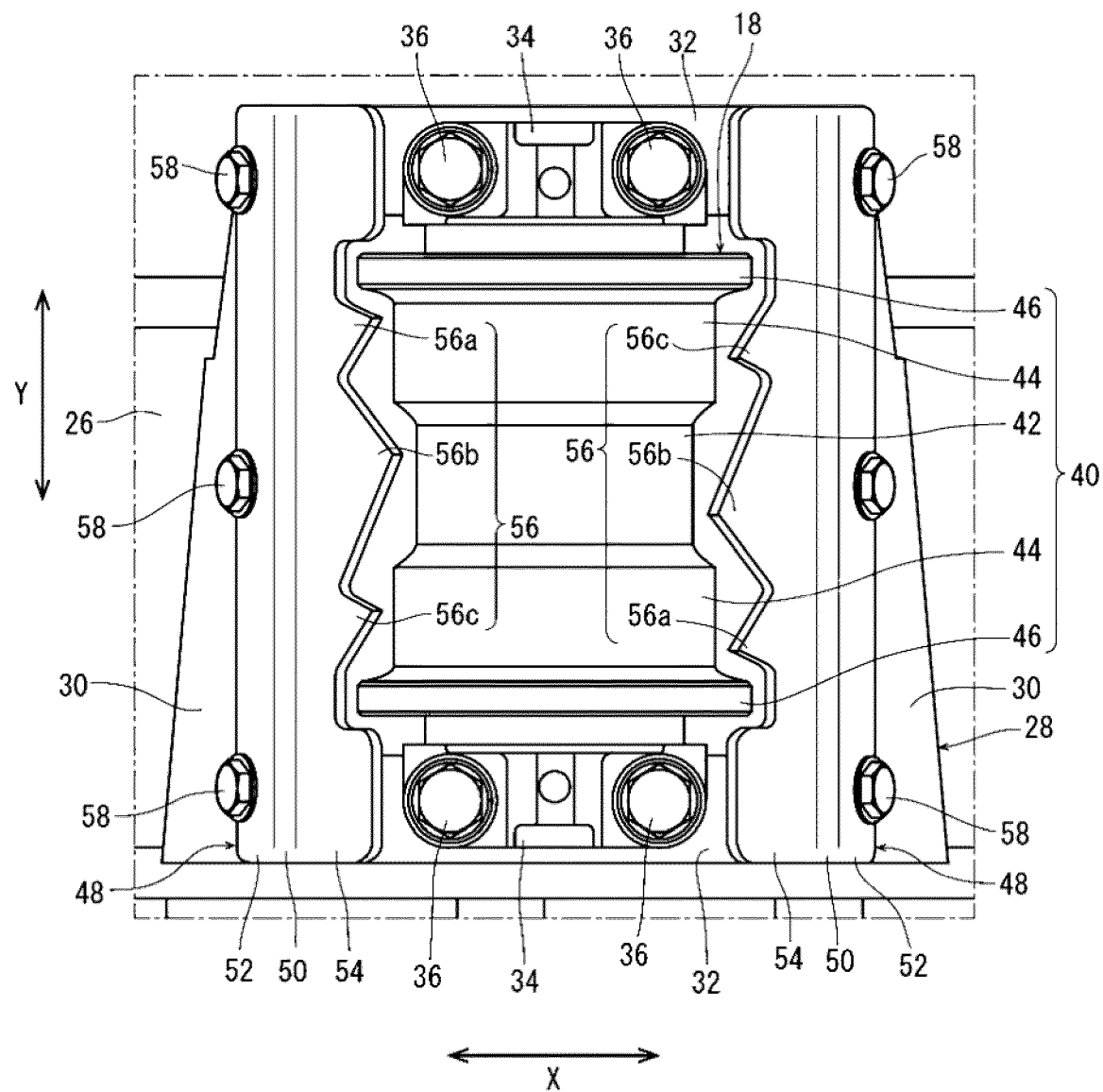
FIG. 3 is a plan view of an upper road wheel and other components illustrated in FIG. 1.
Figure 4:
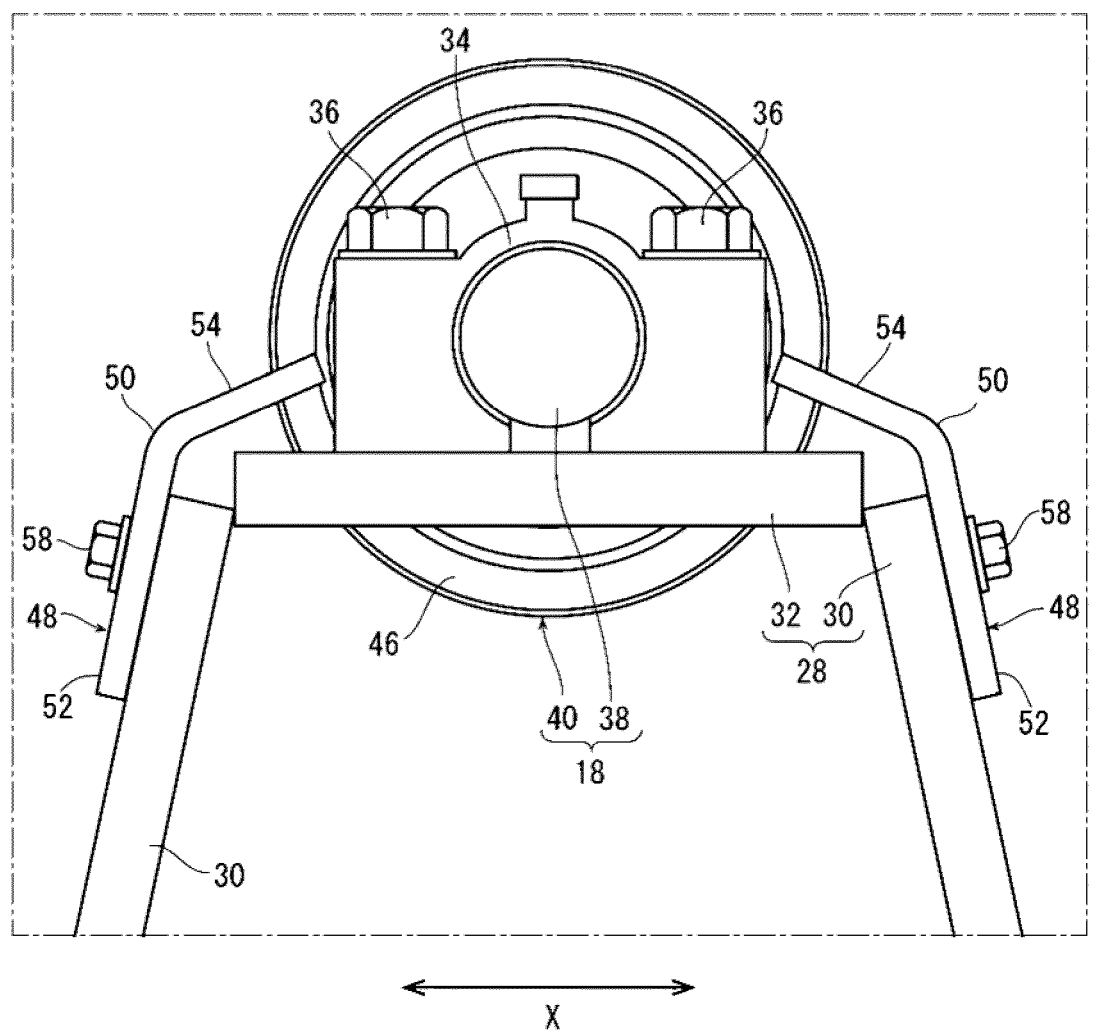
FIG. 4 is a side view of an upper road wheel and other components illustrated in FIG. 1.

When description is made with reference to FIGS. 2 to 4, the bracket 28 has a pair of front and back vertical plates 30 extending upward from the upper surface of the upper wall 26 spaced apart from each other in the front-rear direction, and a pair of right and left support pieces 32 bridged between the upper ends of respective vertical plates 30 spaced apart from each other in the right-left direction. In the illustrated embodiment, one vertical plate 30 extends obliquely and upwardly toward the other vertical plate 30 side, and the other vertical plate 30 extends obliquely and upwardly toward the one vertical plate 30 side. That is, the dimension between the pair of vertical plates 30 becomes gradually narrower from a lower portion to an upper portion. A bearing 34 that supports the upper road wheel 18 is fixed, to the upper surface of each support piece 32 by bolts 36.

As illustrated in FIGS. 2 to 4, the upper road wheel 18 includes a pair of shafts 38 fixed to each bearing 34 and a cylindrical main body 40 rotatably supported by each shaft 38 about an axis extending in the right-left direction. As illustrated in FIGS. 2 and 3, the main body 40 has a central recess 42 located in the right-left direction center, a pair of contact portions 44 located on both the right and left sides of the central recess 42, and a pair of flange portions 46 located on a right-left directional outer side of each of the pair of contact portions 44. As will be understood by referring to FIG. 3, the outer peripheral surface of the main body 40 has step differences, and the outer diameter of the contact portion 44 is larger than the outer diameter of the central recess 42, and the outer diameter of the flange portion 46 is even larger than the outer diameter of the contact portion 44. The lower end of the link member 22a of the crawler belt 22 comes into contact with the outer peripheral surfaces of the contact portions 44, and the upper road wheel 18 is designed to rotate in conjunction with the crawler belt 22 when the crawler-type vehicle 2 is traveling. The upper road wheel 18 allows the flange portions 46 of the main body 40 to prevent the crawler belt 22 from being deviated in the right-left direction.

Figure 5:
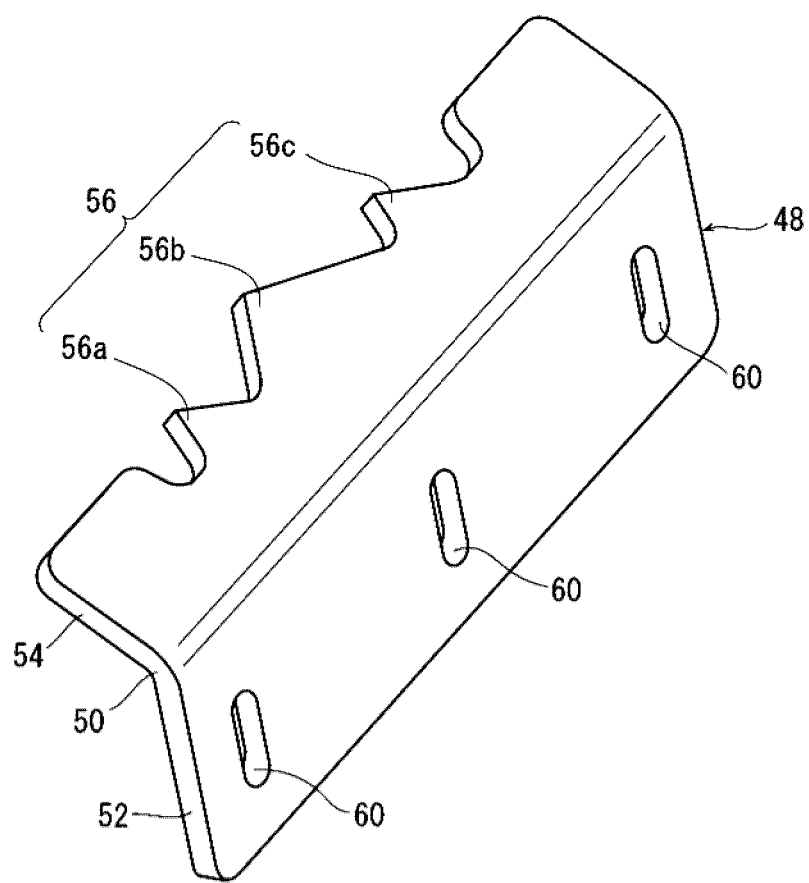
FIG. 5 is a perspective view of a scraper member illustrated in FIG. 1.

When description is made subsequently with reference to FIG. 5 as well as FIGS. 2 to 4, a pair of scraper members 48 for scraping off the mud adhering to the upper road wheel 18 are disposed, on one side in the front-rear direction of the upper road wheel 18 and on the other side in the front-rear direction of the upper road wheel 18. As illustrated in FIG. 5, the scraper member 48 of the illustrated embodiment is formed in a rectangular shape as a whole from an appropriate plate-like metal material such as a steel plate. The scraper member 48 illustrated in FIG. 5 is bent at an intermediate portion 50 in a shorter side direction, but may not be bent. The scraper member 48 of the illustrated embodiment has a downside part 52 that is located below the intermediate portion 50 and an upside part 54 that is located above the intermediate portion 50.

A claw 56 protruding toward the upper road wheel 18 is formed on the upside part 54 of the scraper member 48. In the crawler-type vehicle 2, it is important that a right-left directional position (Y directional position) of the tip of the claw 56 of one scraper member 48 and a right-left directional position (Y directional position) of the tip of the claw 56 of the other scraper member 48 are different from each other. As a result, the claw 56 of the one scraper member 48 and the claw 56 of the other scraper member 48 scrape off the mud adhering to different portions of the main body 40 of the upper road wheel 18, so that the mud adhering to the upper road wheel 18 can be scraped off efficiently.

A plurality of claws 56 are formed on the scraper member 48 of the illustrated embodiment. As illustrated in FIGS. 2, 3 and 5, the claws 56 have a first claw 56a, a second claw 56b and a third claw 56c. As illustrated in FIG. 3, in the right-left direction, the first and third claws 56a and 56c of each scraper member 48 are positioned at the contact portions 44 of the main body 40 of the upper road wheel 18, and the second claw 56b of each scraper member 48 is positioned in the central recess 42 of the main body 40.

In a case where a plurality of claws 56 are formed on the scraper member 48, a right-left directional position of the tip of at least one of the claws 56 of the one scraper member 48 only needs to be different from right-left directional positions of the tips of a plurality of the claws 56 of the other scraper member 48. As will be understood by referring to FIG. 3 in the illustrated embodiment, the right-left directional positions of the tips of the first to third claws 56a, 56b, and 56c in the one scraper member 48 do not overlap with any of the right-left directional positions of the tips of the first to third claws 56a, 56b, and 56c in the other scraper member 48.

Further, in the illustrated embodiment, although the shape of the one scraper member 48 and the shape of the other scraper member 48 are identical to each other, the right-left directional dimensions of the first to third claws 56a, 56b, and 56c become gradually narrower toward the upper road wheel 18, and further the first to third claws 56a, 56b, and 56c are formed in a right-left asymmetrical triangular shape. As a result, the right-left directional positions of the tips of the first to third claws 56a, 56b, and 56c in the one scraper member 48 are different from the right-left directional positions of the tips of the first to third claws 56a, 56b, and 56c in the other scraper member 48.

Figure 6:
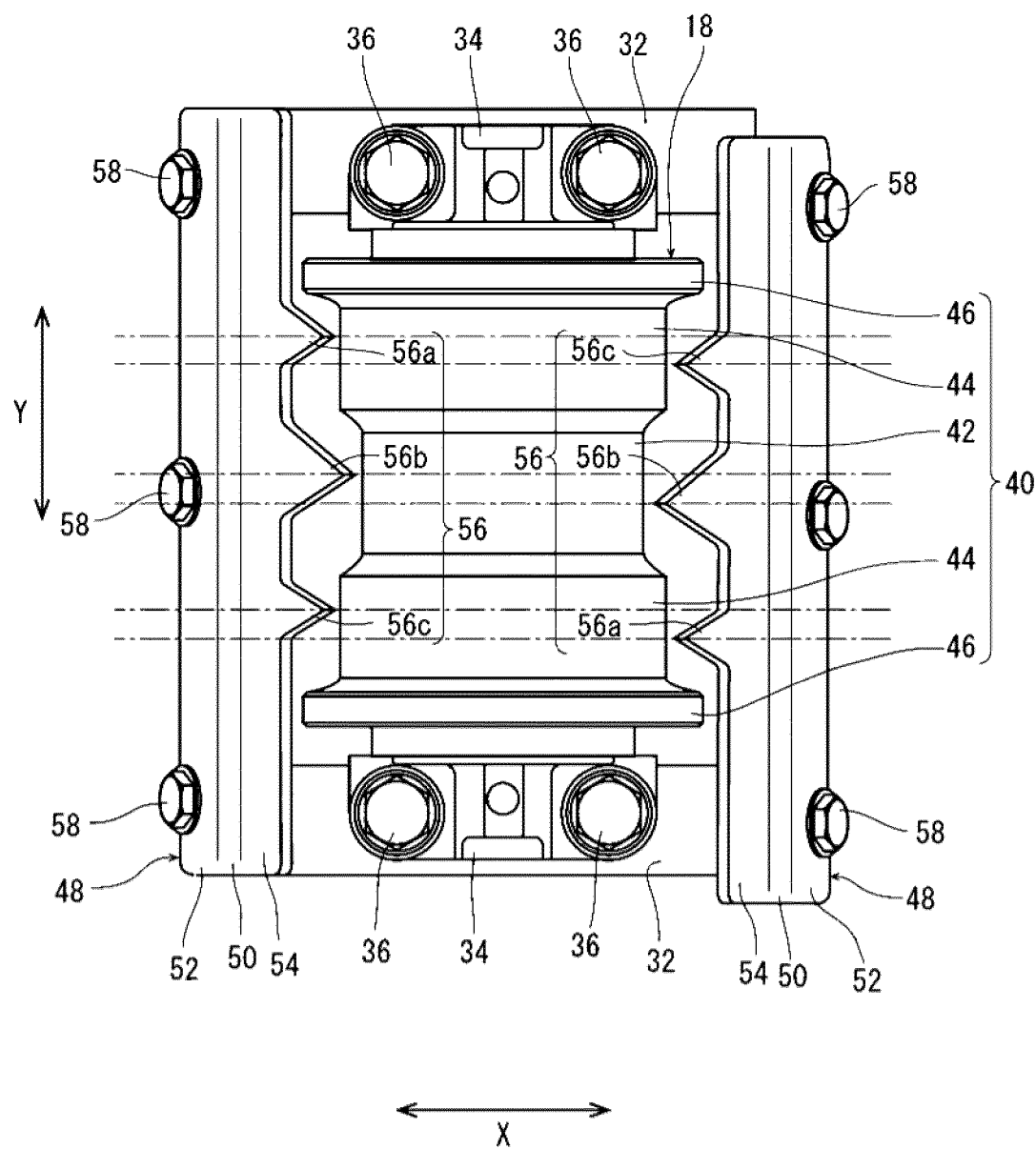
FIG. 6 is a plan view of an upper road wheel and other components in a case where a right-left directional position of one scraper member and a right-left directional position of the other scraper member are different from each other.

When description is made with reference to FIG. 6, the first to third claws 56a, 56b, and 56c of the scraper members 48 may be formed bilaterally symmetrically (line-symmetrically) with straight lines extending in the front-rear direction passing through respective tips thereof as the axes of symmetry. In a case where the first to third claws 56a, 56b, and 56c are bilaterally symmetrical, as illustrated in FIG. 6, by making a right-left directional position of the one scraper member 48 and a right-left directional position of the other scraper member 48 different (deviated) from each other, right-left directional positions of the tips of the first to third claws 56a, 56b, and 56c on the one scraper member 48 and right-left directional positions of the tips of the first to third claws 56a, 56b, and 56c on the other scraper member 48 may be prepared so as to get different from one another.

As illustrated in FIGS. 2 to 4, the scraper members 48 are attachably and detachably fixed to the vertical plates 30 of the bracket 28 by bolts 58. As illustrated in FIG. 5, a plurality of elongated holes 60 extending in a shorter side direction of the scraper member 48 spaced apart from each another in a longer direction of the scraper member 48 (in an up-down direction when the scraper member 48 is fixed to the vertical plate 30) are formed, in the downside part 52 of the scraper member 48, and bolts 58 are passed through the elongated holes 60. Accordingly, the scraper member 48 is configured to be movable toward the upper road wheel 18, and an up-down directional position of the scraper member 48 is adapted to be adjustable.

Therefore, when the claws 56 of the scraper members 48 of the illustrated embodiment are worn away, gaps between the tips of the claws 56 and the outer peripheral surface of the upper road wheel 18 can be adjusted by moving the scraper member 48 toward the upper road wheel 18. Further, since the scraper members 48 are attachably and detachably fixed to the vertical plates 30, the scraper members 48 having such claws 56 that have a shape corresponding to the soil property of the site where the crawler-type vehicle 2 is used can be properly selected and can be mounted on the crawler-type vehicle 2.

As described above, in the crawler-type vehicle 2 of the illustrated embodiment, a pair of scraper members 48 formed with the claws 56 protruding toward the upper road wheels 18 are disposed on one side in the front-rear direction and on the other side in the front-rear direction of the upper road wheels 18, and the right-left directional positions of the tips of the claws 56 of the one scraper member 48 and the right-left directional positions of the tips of the claws 56 of the other scraper member 48 are different from one another. As a result, when the upper road wheels 18 in conjunction with the crawler belt 22 rotates, the claws 56 of the one scraper member 48 and the claws 56 of the other scraper member 48 scrape off the mud adhering to different parts of the main body 40 of the upper road wheels 18, so that the mud adhering to the upper road wheels 18 can be efficiently scraped off.

Without being limited to the above-mentioned form of the scraper member 48, the shape of the claws 56 of the scraper members 48 may be trapezoidal or rectangular, for example. The number of the claws 56 of the scraper members 48 is arbitrary, and may be 1, 2, or 4 or more. The holes of the scraper members 48 through which the bolt 58 passes do not have to be the elongated holes 60. The scraper members 48 may be welded to appropriate members such as the vertical plates 30, or the upper walls 26 of the support members 12.

The invention claimed is:

1. A crawler-type vehicle comprising: a crawler frame extending in a front-rear direction; a drive wheel mounted on one side end part of the crawler frame in the front-rear direction; an idler wheel mounted on the other side end part of the crawler frame in the front-rear direction; an upper road wheel mounted on an upper part of the crawler frame in between the drive wheel and the idler wheel; a lower road wheel mounted on a lower part of the crawler frame in between the drive wheel and the idler wheel; and a crawler belt wound around the drive wheel, the idler wheel, the upper road wheel and the lower road wheel, wherein
   a pair of scraper members formed with claws protruding toward the upper road wheel are disposed, on one side in the front-rear direction and on the other side in the front-rear direction of the upper road wheel, wherein
   a right-left directional position of a tip of a claw on one of the pair of scraper members and a right-left directional position of a tip of a claw on the other of the pair of scraper members are different from each other, and wherein the right-left directional positions of the tips of the claws of one of the scraper members do not overlap with any of the right-left directional positions of the tips of the claws of the other scraper member.

2. The crawler-type vehicle according to claim 1, wherein a plurality of the claws are formed in each of the pair of scraper members, and a right-left directional position of a tip of at least one claw of a plurality of claws of the one of the pair of scraper members is different from any of right-left directional positions of tips of a plurality of claws of the other of the pair of scraper members.

3. The crawler-type vehicle according to claim 1, wherein a shape of the one of the pair of scraper members and a shape of the other of the pair of scraper members are identical to each other.

4. The crawler-type vehicle according to claims 1, wherein right-left directional dimensions of the claws become gradually narrower toward the upper road wheel, and further the claws are formed right-left asymmetrically.

5. The crawler-type vehicle according to claims 1, wherein a right-left directional position of the one of the pair of scraper members and a right-left directional position of the other of the pair of scraper members are different from each other.

6. The crawler-type vehicle according to claims 1, wherein the pair of scraper members are attachably and detachably fixed to the crawler frame and further configured to be movable toward the upper road wheel.

\* \* \* \* \*